2 Sheets—Sheet 1.

G. R. WILLIAMS.
Horse Hay-Rake.

No. 207,927.  Patented Sept. 10, 1878.

WITNESSES
F. L. Ourand
Wm Blackstock

INVENTOR
George R. Williams
By Hill & Ellsworth
his ATTORNEYS

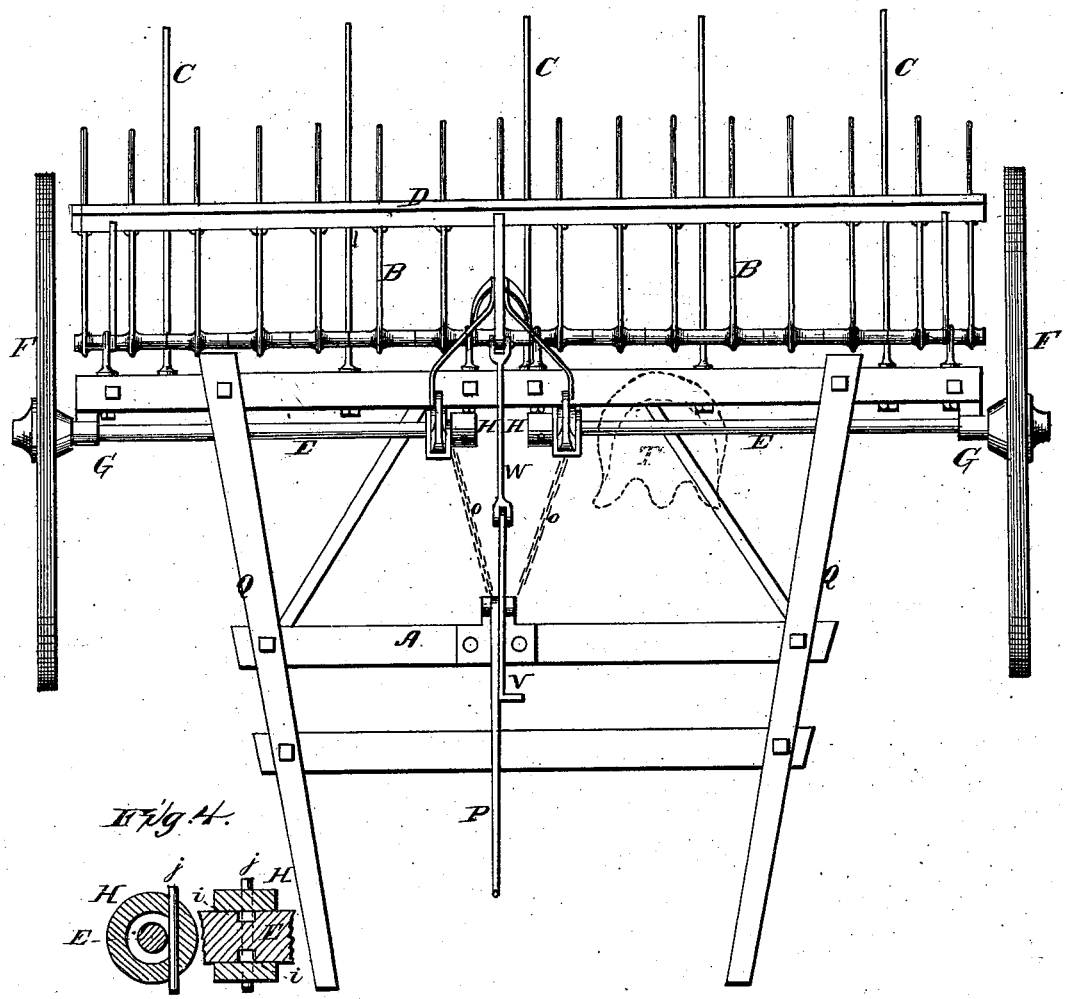

UNITED STATES PATENT OFFICE.

GEORGE R. WILLIAMS, OF ITHACA, NEW YORK.

IMPROVEMENT IN HORSE HAY-RAKES.

Specification forming part of Letters Patent No. 207,927, dated September 10, 1878; application filed February 14, 1878.

*To all whom it may concern:*

Be it known that I, GEORGE R. WILLIAMS, of Ithaca, in the county of Tompkins and State of New York, have invented certain Improvements in Horse Hay-Rakes; and I do hereby declare the following to be a full and exact description of the same, reference being had to the accompanying drawings, forming part of this specification, in which—

Figure 1:
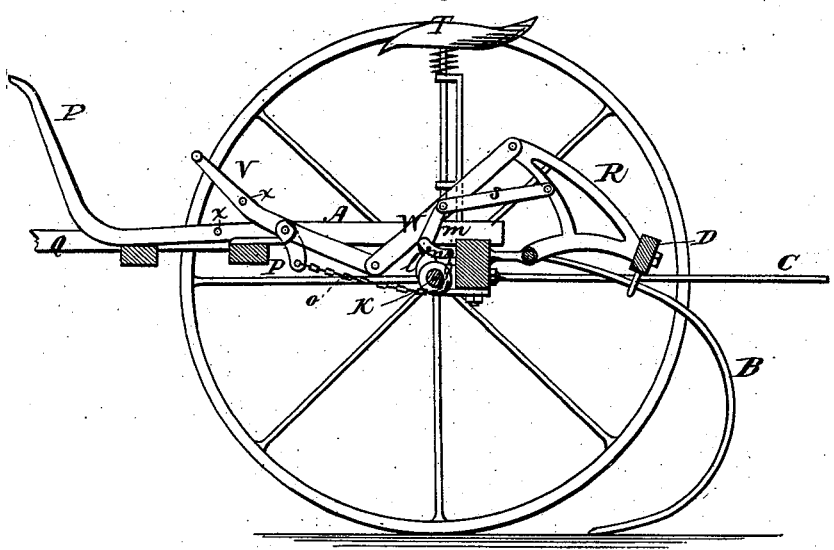
Figure 2:
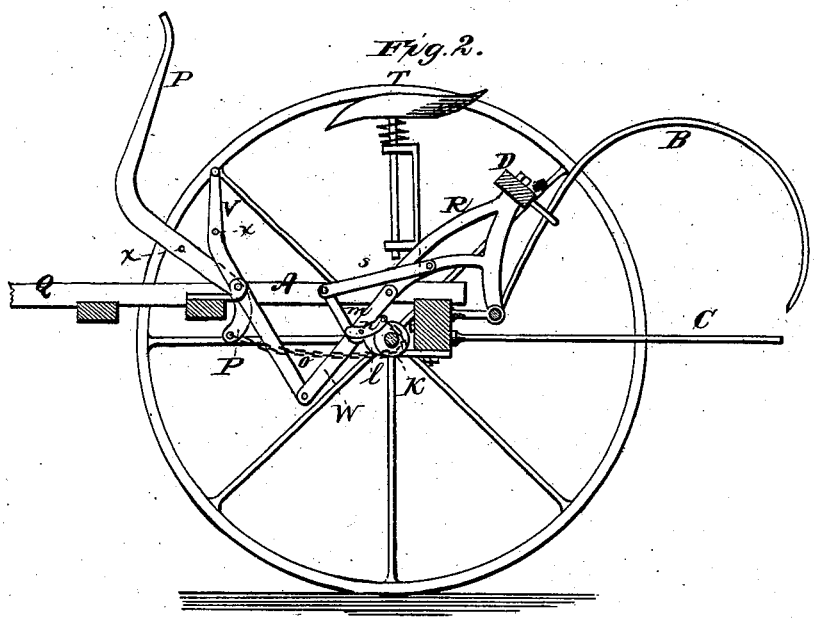

Figure 1 is a longitudinal section of the rake in a working position. Fig. 2 is a similar view of the rake in the act of dumping. Fig. 3 is a top-plan view, and Fig. 4 is a sectional view, of the devices used to prevent the longitudinal slip of the axle.

Similar letters of reference in the several figures indicate the same parts.

My invention has for its object to improve the construction and operation of that class of horse hay-rakes in which the teeth are raised by friction applied to a divided axle rotated by the supporting-wheels; and to this end it consists in improved means for effecting the connection between the rotating axle and the rake-teeth, which I will now proceed to describe.

In the accompanying drawings, A represents the frame of the rake, carrying the teeth B, clearer-bars C, and pressure-bar D. E E is the axle, made in two parts, whose ends approach and are near each other at the center of the rake. Their outer ends are firmly keyed to the driving-wheels F F, so as to rotate with them, and the frame is mounted upon them by the boxes or loops G next the wheels. The inner ends of the divided axle work in boxes H H, which may be made in one or two parts, and bolted to the under side of the frame, as shown. To prevent the parts of the axle from slipping longitudinally their inner ends are formed with a circumferential groove, *i*, and a vertical pin, *j*, passing down through the boxes enters the groove, as shown in Fig. 4. This allows the parts of the axle to turn freely, but prevents them from sliding through the boxes.

K K are pulleys, firmly keyed to the inner ends of the axle near the boxes H H, and *l l* are friction-straps embracing such pulleys, one end of each strap being fastened to an upright arm, *m*, and the other to a U-shaped lever, *n*, pivoted or jointed to the upright arm by having its looped end fitting within a recess in the front of the arm. One arm of the U-shaped lever is prolonged to the rear beyond the pivot of the strap, and is connected by a chain or cord, *o*, to the lower arm of a bent lever, P, pivoted to one of the front cross-pieces of the frame between the thills Q Q. This chain or cord plays freely through the end of the lever P, so as to equalize the strain upon the two friction-straps when they are drawn down to gripe the pulleys.

R is a cast-metal frame of irregular form, the base of which at one end articulates upon the rod carrying the rake-teeth, and at the opposite end is secured to the pressure-bar, while its upright portion is connected to the arm *m* of the friction-strap by a pivoted connecting-rod, *s*.

When it is desired to dump the load by this mechanism, the driver on the spring-seat T pulls the long end of the lever P toward him, which, through the chain *o* and levers *n*, tightens the friction-straps upon their pulleys, and causes them to turn therewith as the axle continues to revolve. This action turns the upright arms *m* forward, pulling upon the connecting-rod *s* and frame R, and thereby raising the teeth to dump the load.

Instead of the hand-lever, the dumping action may be performed by a foot-lever.

The teeth may be again dropped to the ground in raking position by the driver loosening the gripe of the friction-straps, or a suitable tripping device or stop may be employed to produce this result.

By this construction both wheels are made to do their proportion of the work in turning a corner, instead of throwing the labor entirely upon one wheel, as is the case with rakes which are provided with a single or undivided axle.

The location of the friction mechanism at the center of the rake brings it under perfect control of the driver, and adapts it to be made strong and compact.

V is a foot-lever, hung centrally upon the pivot of the lever P, and having its inner end connected, by a rod, W, to the extreme upper point of the frame R. This arrangement is employed for holding the rake-teeth in contact with the ground to gather large loads of hay, which result is effected by the driver pressing his foot upon the forward bent end of the lever, as will be readily understood.

If for any reason it is desirable to convert the rake into a hand dumping-machine, the two levers P V are locked together by passing a pin or bolt through the holes $x$, and the chain detached from the lever P or friction-straps. Said lever then becomes a lifting-lever, operating through the lever V, connecting-rod W, and frame R to raise and lower the rake-teeth.

If desired, the friction-straps may be applied directly to the ends of the divided axle instead of to pulleys thereon, as will be readily seen.

Having thus described my invention, what I claim as new is—

1. The combination, with the pulleys on the inner ends of the divided axle, of the arms $m$, suitably connected with the rake-teeth, the friction-straps $l\,l$, the pivoted U-shaped levers $n$, connected to each other by a chain arranged to play freely through the hand-lever P, substantially as described, for the purpose specified.

2. In a horse hay-rake, the combination of a divided axle, friction-pulleys, friction-straps, adjusting-chain $o$, and lever P with the frame R, the pivoted connection $s\,m$ extending therefrom to each part of the axle, and the connecting-bar W extending from said frame, between the two connections $s\,m$, to the rear end of the lever V, substantially as described.

3. The combination of the arms $m$ with the friction-straps, the U-shaped levers, and the teeth of the rake, substantially as described, for the purpose specified.

4. The frame R on the rake-teeth and pressure-bar, connected with the foot-lever V by the rod W, and with the friction-straps $l$ by the rod $s$ and arms $m$, substantially as described.

GEORGE R. WILLIAMS.

Witnesses:
 WM. G. KING,
 W. H. PERRY.